Feb. 21, 1967  V. M. KRAMER ETAL  3,304,581
APPARATUS FOR MAKING SPIRALLY CORRUGATED RUBBER TUBING
Original Filed Nov. 22, 1960  3 Sheets-Sheet 2
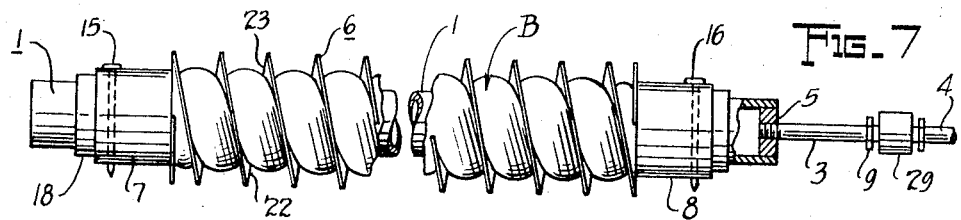
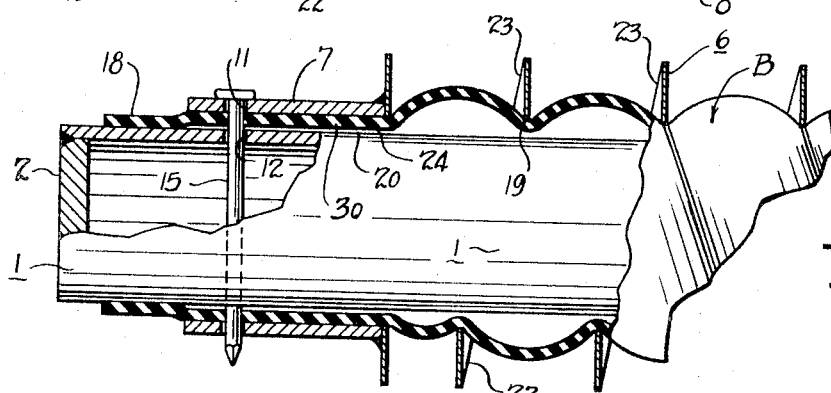
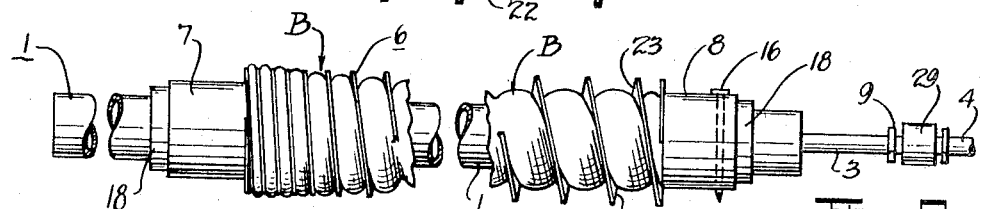
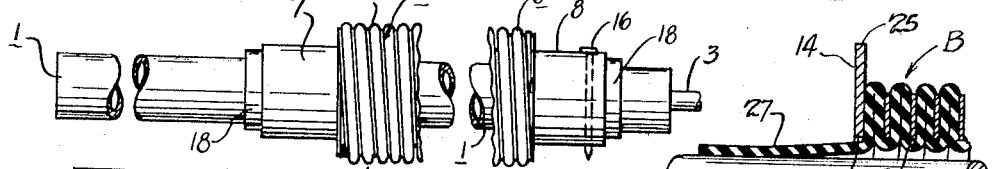
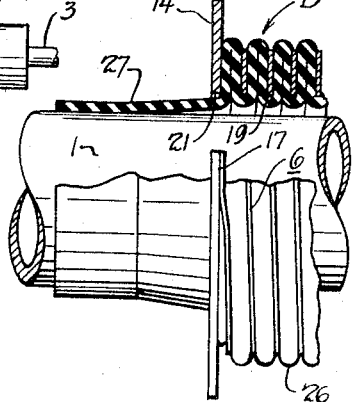
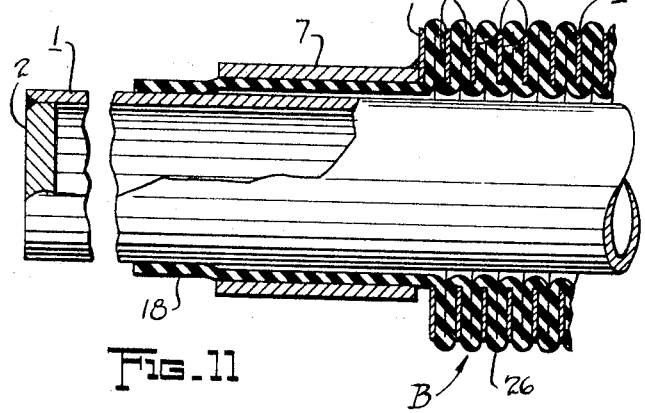
INVENTOR.
VANCE M. KRAMER
LAWRENCE W. CARLTON
BY Bosworth, Sessions,
Herrstrom & Knowles
ATTORNEYS.

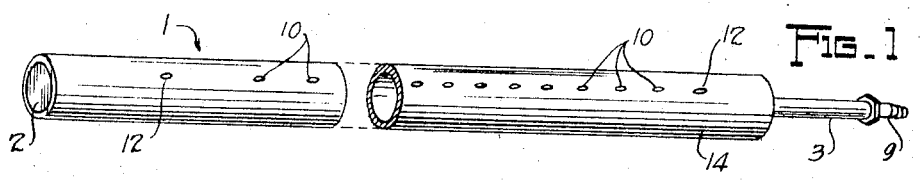
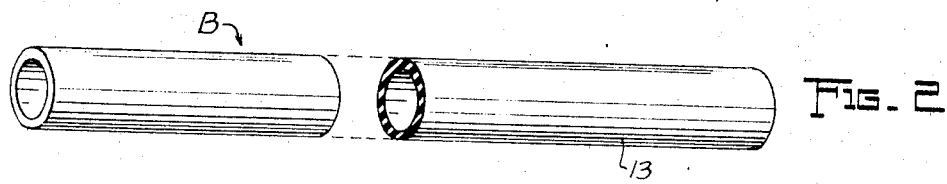
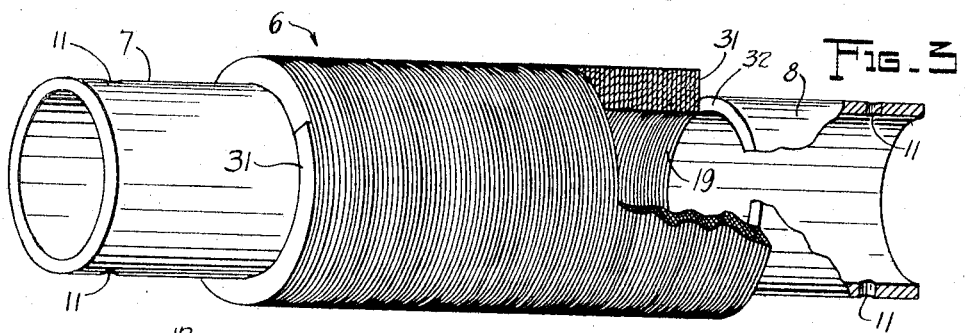
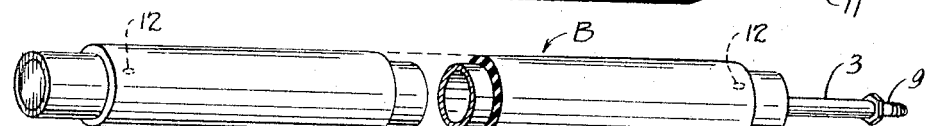
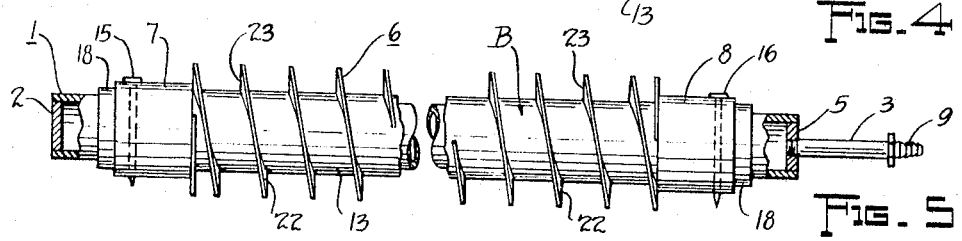
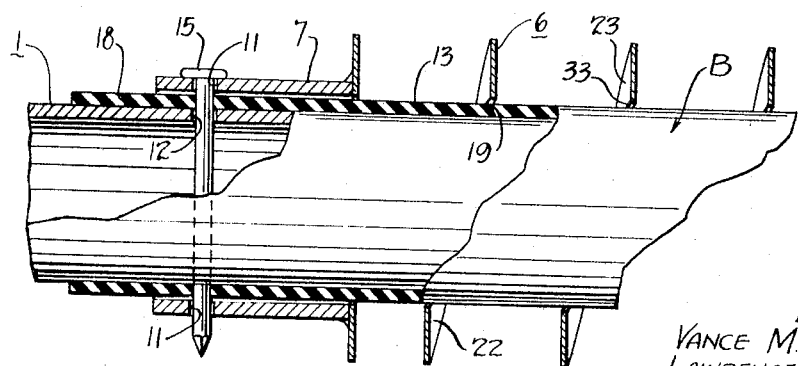

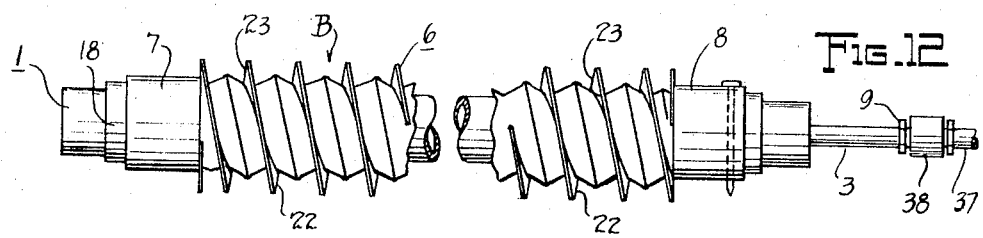
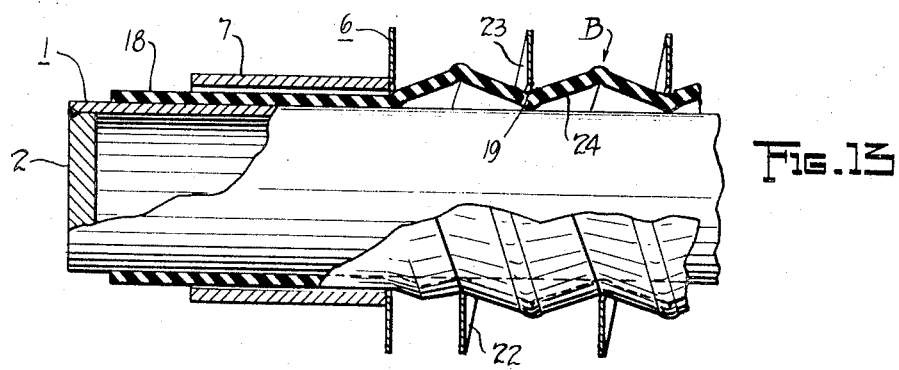
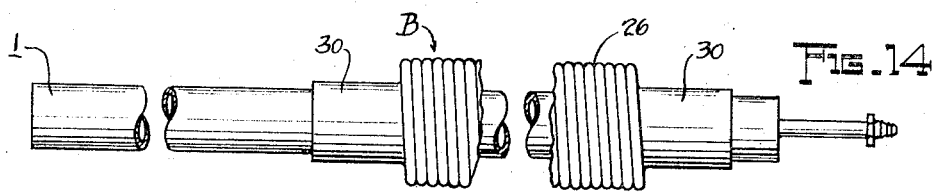
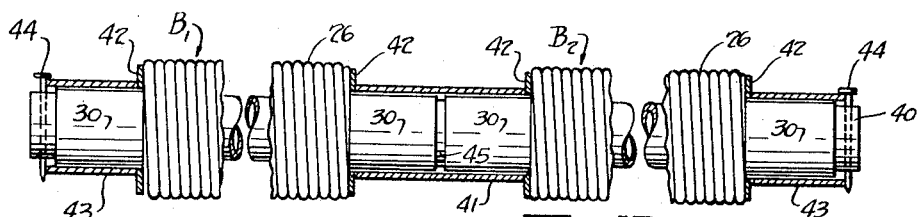
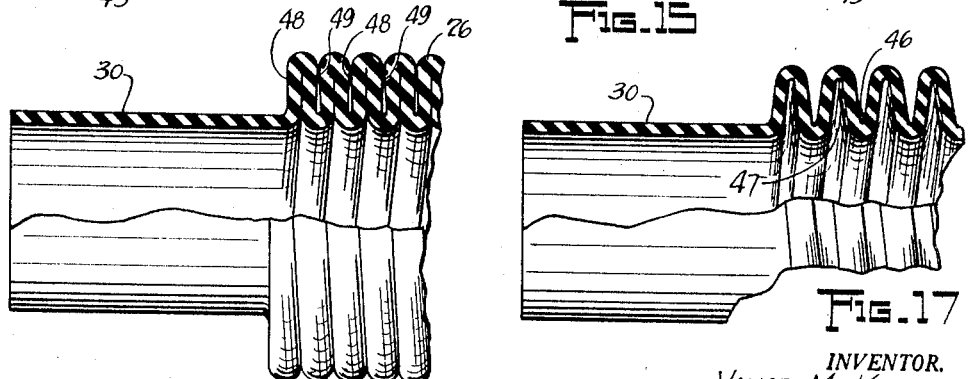
INVENTOR.
VANCE M. KRAMER
LAWRENCE W. CARLTON
BY Bosworth, Sessions,
Herrstrom & Knowles
ATTORNEYS.

United States Patent Office

3,304,581
Patented Feb. 21, 1967

3,304,581
APPARATUS FOR MAKING SPIRALLY
CORRUGATED RUBBER TUBING
Vance M. Kramer, Perrysburg, Ohio 43551, and Lawrence W. Carlton, North Baltimore, Ohio 45872
Original application Nov. 22, 1960, Ser. No. 71,077, now Patent No. 3,168,604, dated Feb. 2, 1965. Divided and this application Jan. 6, 1965, Ser. No. 423,777
2 Claims. (Cl. 18—45)

The present application is a division of co-pending United States application for patent, Serial Number 71,077, filed November 22, 1960, now Patent 3,168,604, dated February 2, 1965, for Process for Making Spirally Corrugated Rubber Tubing Using Axially Extensible Helix.

This invention relates to new and improved apparatus for economically manufacturing flexible corrugated rubber tubing, the tubing so made being characterized by uniformity in wall thickness, increased flexibility and, when and if desired, a high degree of extensibility.

The principal object of the invention is to provide simple, inexpensive apparatus for making such tubing quickly and easily with minimum effort and without need for extensive training of or experience by the person or persons doing the job. The invention contemplates particularly the manufacture of improved spirally corrugated flexible rubber tubing in which adjacent convolutions of the spiral ridge are closely spaced in the unstressed condition of the tubing, have surfaces contacting or closely confronting one another in generally parallel relation.

A more specialized object is to provide apparatus for making spirally corrugated longitudinally extensible rubber tubing which permits the operator readily to vary either the pitch or the radial depth or both the pitch and the depth of the convolutions, so as to meet the requirements of different users, while maintaining uniformity in such pitch and depth in any desired run of production.

Another object is to provide such apparatus adapted for rapid, economical and large scale commercial production of corrugated rubber tubes of different lengths, different inside and outside diameters and different wall thicknesses.

Another object is to provide such apparatus for making spirally corrugated rubber tubing having integral cylindrically shaped end connector portions with essentially the same internal diameter as the through passage of the corrugated body portion of the tubing.

Other objects and advantages relate to certain novel structural and mechanical details of and combinations between certain components of the apparatus, as will become apparent from the following detailed description of preferred embodiments of the apparatus representing the best known mode of practicing the invention. Such description is made in connection with the accompanying drawings forming a part of the specification.

In the drawings:

FIG. 1 is a foreshortened perspective view of an elongated hollow cylindrical tube support or mandrel comprising part of the present apparatus;

FIG. 2 is a foreshortened perspective of an uncured rubber tubing blank of conventional type suitable for use with the apparatus;

FIG. 3 is a perspective view, partly in section and with parts broken away and removed, of an helical coil steel spring former comprising another part of the apparatus;

FIG. 4 is a foreshortened perspective view showing the rubber tubing blank of FIG. 2 assembled over the mandrel of FIG. 1;

FIG. 5 is an elevational view, foreshortened, showing the spring former of FIG. 3 assembled over the mandrel and rubber tube blank of FIG. 4 in embracing relation, the helical coil spring former being stretched axially with its convolutions distributed uniformly along the length of the mandrel;

FIG. 6 is a fragmentary elevational detail of the left end of the assembly of FIG. 5, enlarged with respect to that figure and with parts broken away and removed to show the relationships between the several cooperating parts of the apparatus and the rubber tube blank;

FIG. 7 is a foreshortened elevational view, similar to FIG. 5, showing the tube blank expanded by differential air pressure and confined by the helical coil former;

FIG. 8 is a fragmentary elevational detail of the left end of the assembly of FIG. 7, enlarged with respect to that figure and with parts broken away and removed to show the relationships between the parts;

FIG. 9 is a foreshortened elevational view showing an intermediate stage in axially collapsing the inflated rubber tube blank and the spring former;

FIG. 10 is a foreshortened elevational view; similar to FIGS. 5, 7 and 9, showing the rubber tube blank and spring former fully collapsed on the mandrel;

FIG. 11 is an elevational detail of the left end of the assembly of FIG. 10, enlarged with respect to that figure, partly in section and with parts broken away and removed to show the repationships between the parts;

FIG. 11a is a view similar to FIG. 11 showing a modification of the apparatus in which the cylindrical sleeves on the ends of the helical spring wire former are replaced by flat metal rings;

FIG. 12 is a foreshortened elevational view, similar to FIGS. 5, 7 and 10, showing the rubber tube blank and steel spring former extended axially after the collapsing represented by FIG. 9, such extension having the effect of radially contracting the corrugations of the tube blank to permit axial collapsing of the spring former independently of the blank and removal of such former from about the tube blank;

FIG. 13 is a fragmentary elevational detail of the left end of the assembly of FIG. 12, enlarged with respect to that figure, partly in section and with parts broken away and removed, to show the relationships between the parts;

FIG. 14 is a foreshortened elevational view, similiar to FIGS. 5, 7, 10 and 12, showing the tube blank axially compressed to reform therein the corrugations following the removal of the steel spring former;

FIG. 15 is a foreshortened elevational view, partly in section and with parts broken away and removed, showing a number of raw rubber tube blanks, each with corrugations formed as in the preceding figures by axially collapsing the blanks, assembled together on a common mandrel or support with intervening tubular spacers surrounding the integral cylindrical end connector portions of the blanks, the assembly being ready for heat curing of the formed rubber tube blanks;

FIG. 16 is an elevational view, enlarged with respect to FIGS. 14 and 15, showing an end portion of the spirally corrugated rubber tubing after cure, the cured tube having been removed from the support or mandrel, this view being partly in section with part of the tubing removed to show the contour of the flexible tube wall and the integral cylindrical end connector; and FIG. 17 is a fragmentary elevational detail similar to FIG. 16 showing a spirally corrugated flexible rubber tube in which the corrugations are somewhat spread out instead of being completely collapsed against one another as in FIG. 15.

The apparatus of the present invention is utilized to advantage in a process for making a spirally corrugated rubber tube. In such process a raw rubber tube blank B, FIG. 2, of uniform section, is formed as by extrusion, is treated both internally and externally with a suitable anti-adhesion agent, and is then cut into equal lengths to form blanks. The operator draws one such blank axially over a support or mandrel 1 supported cantilever fashion at one end. This mandrel comprises a metal tube, which may be of steel, of uniform circular cross section and of any convenient length such as from about four to about twenty feet. The mandrel has a smooth cylindrical external surface of, say 1½ to 2 inches diameter for making vacuum cleaner hose, larger or smaller diameter for other types of tubing or hose. The ends of the tubular mandrel are provided with closures 2, 5 comprising steel plugs welded in place. A tubular stem 3 is secured in the plug 5 and provided with an end fitting 9 adapted to mate with a suitable quick detachable fitting on the end of either an air supply line so that air under pressure can be fed into the mandrel interior or a vacuum line so that the mandrel can be evacuated.

The tubing blank B is slightly shorter than the mandrel so that end portions of the mandrel project beyond the blank as shown in FIG. 4. The internal diameter of the tube blank B, as formed, is the same as or slightly more than the external diameter of the cylindrical mandrel so that the raw rubber tube is about 1/64 inch to about 1/32 inch larger than the diameter of the mandrel. The drawing of the tube blank onto the mandrel is done manually and may be facilitated by introducing air under pressure into the interior of the mandrel, such air being received through line 4 and fitting 29, later described, and escaping through a multiplicity of distributed radial holes 10 drilled in the mandrel and providing a cushion of air between the tube and the mandrel.

After the tubing blank B is received on the mandrel, a spring former 6 is assembled thereover. This former comprises spring metal, preferably a single strip of thin high tensile strength flat steel ribbon bent in its plane to helical shape with adjacent convolutions laid against one another and of the same diameter. The wide dimension of the strip is thus disposed in radial relation to the longitudinal axis of the helix with the edge of the strip normal to such axis. This arrangement obtains maximum strength and resistance against radial deformation with minimum resistance to axial elongation. In its natural shape or condition, to which it tends to revert by inherent resiliency, the former 6 is axially collapsed, as shown in FIG. 3, with adjacent convolutions closely spaced, preferably disposed flatwise against one another in contacting relation, or substantially so. The ends of the spring strip are bent to form grasping or pin receiving eyes or, as shown, are provided with cylindrical handles or sleeves 7, 8 disposed in coaxial relation to the spring. The sleeves 7, 8 are of metal such as steel, heavier than the spring helix 6 and nondeformable in use. Radial end faces, one of which is indicated at 32, FIG. 3, on the sleeves are received flatwise against the outsides of endmost turns 31 of the spring helix former and are suitably secured thereto as by welding all around the circumferences of the sleeves.

With the former received over the tubing blank and mandrel, axial forces are applied to the sleeves 7, 8 in opposite directions to stretch the former to the full length of the tube blank B, or substantially so. Metal pins 15, 16 may then be inserted through radial, diametrically aligned holes 11 in the sleeves and through registering holes or sockets 12 provided in the mandrel to hold the former 6 in extended position, if desired. However, use of the pins 15, 16 is not essential and one or both may be eliminated. The helical spring former by reason of its elastic character and because of the loose fit on and about the tube blank B as represented by clearance 33, FIG. 6, between the inner edge 19 and the blank, distributes its convolutions uniformly along the length of the mandrel. If necessary, the operator manually relieves any binding and adjusts the spring former to obtain uniform spacing of its convolutions, the appearance of the assembly at this stage being shown to advantage in FIGS. 5 and 6.

Thus the internal diameter of the confining spring helix is slightly greater than that of the rubber tube supported on the mandrel so that in stretching the helix over the full length of the supported tube, the spring convolutions move freely without binding on the rubber stock, and yet not so much greater than the tube blank diameter that in the subsequent inflation the blank is excessively stretched or objectionably distorted before contacting and being confined by the helical former 6. For example, in making the vacuum cleaner tubing or hose referred to, it is satisfactory to allow a clearance of from about 1/16 to about 1/4 inch between external surface 13 of the tube blank and inner periphery 19 of the former.

The spring former has uniform convolutions which in the unstressed condition of the former are disposed in closely spaced side by side relation and, under opposite axial forces applied to the ends of the former, distribute themselves uniformly along the embraced tube. The former is sufficiently weak and has a resistance to axial elongation sufficiently low to enable the operator or operators easily to stretch it manually to the full length of the supported tube in separating the convolutions to the desired spacing. In making corrugated rubber tubing larger in diameter and heavier in section than that referred to, the spring helix former is heavier and larger than that described and suitable power driven mechanism may be employed to stretch it over the tube blank, to effect the subsequent collapsing operation, to separate the tube blank from the former, and to recollapse the tube for the cure.

The spacing of the convolutions of the stretched spring former depends upon the desired depth of the corrugations in the completed flexible tubing. For high flexibility deep corrugations are needed and are obtained by widely spacing the convolutions when stretching the helical coil former. For low flexibility shallow corrugations are provided and are obtained by relatively closely spaced convolutions of the former. Thus, for most applications of the process, the space between adjacent convolutions of the former in the stretched condition, as in FIGS. 5–8, is from about one half to about three fourths the diameter of the cylinder defined by the inner periphery 19 of the former; this diameter being, for practical considerations, approximately the diameter of the external surface 13 of the tube blank as supported on the mandrel.

In the case of a relatively short tube blank such as used in making a corrugated tube for diving equipment the operator conveniently and manually can hold the spring helix stretched to the desired length without using the pins 15, 16 or either of them and simultaneously can grip the tube blank ends 18 which project axially beyond the sleeves 7, 8 to seal the tube ends against the mandrel; two operators, one at each end of the tube blank, may similarly perform this step of the process on a long tube. Then, as by means of a treadle operated valve, the operator or an assistant introduces pressurized air into the mandrel through a supply line 4 having fitting 29 mating with the mandrel fitting 9. This air inflates the raw rubber tube, distending it outwardly against or into engagement with the confining spring helix former 6. The rubber of the inflated or engaged tube is distended between the convolutions of the wire helix, imparting to the tube blank an incipient or primary corrugated shape shown schematically in FIGS. 7 and 8.

The air is under a pressure of, say, 40–60 pounds per square inch gage from a conventional high volume continuous source, the line fitting 29 being adapted to be quickly, easily and detachably mated to the fitting 9 on the fixed or supported end of the mandrel. At spaced intervals along the mandrel the pressurized air is released through the drill holes 10 of about 1/16 inch diameter into the interior of the tubing blank supported on the mandrel. Although it is not essential to do so, the holes preferably are distributed with a relatively greater number adjacent the fixed end of the mandrel, relatively few or none at and adjacent the outboard end; the reason is that the outboard holes are uncovered during the progressive collapsing of the tube axially, as will appear, and it is desired to minimize air loss through the uncovered holes.

The pressurized air from the mandrel holes 10 inflates the tube blank B, distending it into contact with the inner edge 19 of the confining helical former 6, as shown to advantage in FIGS. 7 and 8. In this connection it is to be observed that the diameter of the clear opening through the former 6 in its distended position is so proportioned in relation to the diameter of the mandrel 1 and the thickness of the blank B as to provide a clearance 20 between internal surface 24 of the inflated tube blank and the external surface of the mandrel 1, such clearance allowing for axial flow of the inflating air between the tube blank B and the mandrel.

It is satisfactory that the operator determine by visual observation that the exposed portions of the tube blank are bowed outwardly with a radius of curvature (as measured in axial planes) approximately equivalent to the spacing between confronting surfaces 22, 23 of adjacent convolutions of the stretched out former helix. In this inflation of the tubing blank, escape of air out the ends of the tubing is prevented, or at least reduced sufficiently to permit maintenance of proper pressure, by suitably clamping or manually holding the tube ends 18 sealingly against the external surface of the mandrel.

With the tubing blank thus distending and engaged against the continuous inner edge 19 of the helical former 6, and while the internal inflating air pressure is maintained to bow outwardly the tubing blank between convolutions of the former, the retaining pins 15, 16, if used, or one of them are or is then withdrawn and the helical former 6 and the tubing blank B are axially compressed in unison while supported on and guided by the internal mandrel. In the collapsing operation the operator slides one end of the tube blank toward the other along the mandrel, or both ends toward the middle, the air seals at the tube ends being maintained, or substantially so. The portions of the tubing blank B exposed between the adjacent convolutions of the former 6 are, by the combination of forces resulting from the simultaneous axial compression and inflation, further bowed outwardly, distended radially and ultimately confined and frictionally held between the parallel confronting surfaces 22, 23 of the former.

While it is generally most convenient to hold one end fast (as by one of the pins 15, 16) while sliding the other end toward it, it is feasible, as indicated above, to slide both ends simultaneously toward one another. In this sliding action there is a progressive conversion of the primary or incipient corrugations shown in FIGS. 7 and 8 into full corrugations which progressively collapse axially against the end which is being moved. The completed corrugations mutually support one another with the wire spring helix confined therebetween and reinforcing or stiffening the rubber tube stock.

The collapsed, axially compressed tubing blank B has a continuous spiral ridge 26 separated by a continuous spiral groove or valley in which is disposed the helical former 6. In the collapsed condition, the clamping of the convolutions of the corrugated tube which comprise the ridge 26 between the parallel confronting faces 22, 23 of the former, retains the tubing blank in the desired spirally corrugated shape without the need for any air or fluid pressure differential between the inside and the outside of the tubing blank. Thus the operator now closes the valve in the air supply line 4 and, if desired, detaches the mandrel fitting 9 from the air line fitting 29.

The preliminary stretching of the spring former over the tube blank and the collapsing operation on the former and the tube blank and also the subsequent stretching of the spring former to remove it from the tube (to be later described) are operations each of which is facilitated by the circular members or sleeves 7, 8 fast on the ends of the spring former 6. These sleeves constitute handles that are readily grasped by the operator or operators. Moreover, each of the sleeves embraces a portion of the tube blank B adjacent and projecting from one end of the corrugated portion and by limiting distention and preventing other distortion of such projecting portion shapes the latter into a cylindrical attaching sleeve which is integral with the corrugated portion of the finished tube.

One or both of the sleeves 7, 8 may be replaced by another form of annular member such as the rigid flat metal ring 14 (FIG. 11a) welded at 17 to the end of the spring former 6 in coaxial relation. The ring 14 has concentric circular inner and outer peripheries and is of heavier section (several times thicker) than the spring former 6 to make it substantially non-deformable in use to prevent distortion and bending. Its inner periphery 21 is substantially equal in diameter to the inner periphery 19 of the spring former and delineates the endmost turn of the groove in the corrugated tube shape by the collapsing operation; its outer periphery 25 is slightly greater in diameter, about ⅛ to about ¼ inch, than the spring former 6, thus providing a convenient hand hold for the operator who can with one hand simultaneously grasp the ring and a projecting portion 27 of the tube blank B to hold the latter sealingly against the mandrel in retaining the inflating air.

After, and, for efficiency in production, this may be and preferably is immediately after, the tube blank B has been collapsed axially as described above, with the confining spring helix former 6 located and helping to shape the corrugations, the collapsed tube and the former are then drawn out or extended to substantially full length on the mandrel, the rubber tube corrugations, now in embryonic condition, contracting radially and withdrawing from between the convolutions of the former and allowing the latter to collapse axially by inherent resiliency or to be collapsed and be removed from the tube blank off and over the free end of the mandrel. The tube and the spring former 6 are shown schematically partially stretched out or extended in FIGS. 12, 13. The removal of the spring former may be facilitated by connecting a vacuum line indicated at 37, FIG. 12, having on its end quick connector fitting 38, to the mandrel fitting 9 and thus reducing the pressure inside the tube blank B so as momentarily to effect radial collapse of the embryonic corrugations of the extended tube by atmospheric pressure sufficiently to allow the spring former to collapse or be collapsed axially and removed.

As a variation of alternative use of the apparatus, the tube blank B and the spring former 6, both collapsed axially as shown in FIGS. 10 and 11, are together removed as a unit from the mandrel 1. Then the removed unit, without any internal support for the rubber tube, is stretched out to the original length of the tubing blank, or substantially so. This contracts the tube corrugations radially, withdrawing them from between the turns of the spring former and allows the latter to collapse or be collapsed axially and removed. Connection of a vacuum line to one end of the stretched out tube as by inserting it into one of the end portions 18 and manually squeezing the latter about the line, the other end of the stretched tube being suitably sealed as by pinching its walls together manually, the tube having no internal support, results in radial collapse of the tube walls so that the corrugations are drawn inwardly clear of the extended spring former to permit the latter to collapse axially and is a refinement of this spring removal step of the process that can be used to advantage with tubes having deep corrugations.

The tube blank is recollapsed on the forming mandrel 1 after removal of the spring former 6. When remounted on the mandrel in recollapsed condition, it has the general appearance shown in FIG. 14. It is preferred, in curing, to mount a plurality of the collapsed tube blanks in end to end relation on a curing mandrel 40, FIG. 15, which in essential respect is the same as the forming mandrel with the distributed radial holes 10 and the inflation stem 3 omitted. Each of the tube blanks B1, B2 shown in FIG. 15 is made and formed by progressive axial collapsing as described above and, after separation of the spring former used in shaping its corrugations, is either recollapsed axially and then transferred to or threaded onto the curing mandrel 40 or threaded onto such mandrel in extended condition with the recollapsing operation taking place on the curing mandrel 40 or as the tube is threaded onto the latter. The axially collapsed corrugated tube blank or blanks are heat cured in open steam as by pressure treatment conventionally in an autoclave.

To prevent axial deformation of the integral end sleeves 30 and to hold the corrugated portions of the tubes in desired collapsed condition, tubular metal spacing sleeves one of which is shown at 41, FIG. 15, are interposed between the successive tube blanks B1, B2 on the curing mandrel 40. These spacing sleeves are cylindrical in shape and each is larger in internal diameter and sufficiently long to extend over the entire axial lengths of the two connector portions 30 of adjacent tube blanks with clearance 45 between such end connectors. Metal rings 42 welded about their inner peripheries onto the ends of the sleeve 41 are provided to engage supportingly the endmost convolutions of the adjacent rubber tubes, such rings preferably having at least substantially the same radial extent or external diameter as the tubing corrugations being supported thereby.

The endmost tubes on the curing mandrel 40 have their projecting integral cylindrical end connector portions 30 embraced and protected by suitable cylindrical tubular sleeves which may be the same as the sleeves 41 or, as shown at 43, may be similar to the sleeves 41 but only half as long, each being provided with but a single corrugation supporting end flange or ring 42 for engagement against the radial face of the last corrugation on the endmost tube blank. The tubes and spacing sleeves are confined on the mandrel 40 between suitable stop means such as pins 44 removably inserted in transverse relation to the mandrel through holes in the latter.

Stripped from the mandrel after curing and cooling, each of the completed corrugated tubes has the appearance shown in FIG. 16, the convolutions of the spiral ridge 26 having substantially flat or planar radial side faces 48, 49 with the confronting side faces or adjacent convolutions contacting one another or substantially so.

Optionally, the tubes can be cured with the convolutions spread out or separated on the curing mandrel 40 instead of being compacted against one another as shown in FIG. 15. When so spread out, the side walls of the tube convolutions define an external outwardly opening groove 46 tapered in depth radially and an internal inwardly opening groove 47, also tapered in depth radially, as indicated in FIG. 17.

The present apparatus includes a convenient feature by which the radial depth of the tube corrugations can be varied. To increase the corrugation depth, the operator relatively increases the length to which the spring former 6 is extended in the step illustrated in FIG. 5. This increases the axial extent of the cylindrical tube blank exposed between adjacent convolutions of the spring former (the blank length-convolution ratio) and which tube blank portion is expanded radially while being shortened axially to form the ridge of the corrugated tube. Conversely, to decrease the corrugation depth the operator relatively decreases the length to which the spring former is extended in the FIG. 5 step.

Optionally, the tube blank B can be cured without removing the spring former 6. That is, after the progressive axial compression of the tubing blank and the helical coil spring former, described above in connection with FIG. 9, which produces the axially collapsed assembly shown in FIGS. 10 and 11, the tube blank is cured, as in the steam chamber referred to, while it remains on the forming mandrel 1 and while the spring former 6 remains embedded in the helical groove of the rubber tube, the parts being held in place and in predetermined position on and in axial relation to the mandrel by the pins 15, 16 inserted through the end sleeves 7, 8 and the mandrel. If desired, the tube blank and spring former may be removed as a unit from the mandrel 1 after the progressive axial collapsing step has been completed, the removed unit then being threaded onto a curing mandrel such as the mandrel 40, along with other combined tube-former units. The curing of the rubber and the subsequent cooling and stripping of the tube from the mandrel and from the spring former are then accomplished. As in the cases of the previous examples curing is done by subjecting the assembly to pressurized steam in an autoclave or similar steam heater, conventional in the rubber industry. Upon completion of the cure, the assembly of cured tube and spring former is suitably cooled as before by blowing normal room temperature air or cooled air thereover or by immersing in or spraying with water at room temperature or below, such as water received through conventional municipal water supply systems. After cooling, the pins 15, 16 or the pins 44, whichever are used, are withdrawn to unlock the helical former 6 and the mandrel 1 (or 40) so that the latter may be slid axially out of the cured tube or tubes. With the mandrel removed, each cured rubber tube and its enveloping spring former 6 are, as a unit, extended or stretched axially to original length and the rubber tube is then stripped from the former 6 with which it was collapsed axially in the corrugation shaping operation, being drawn axially out of one end. In the case of thick walled tubes the stripping of the cured or finished tube from the stretched helical former may be facilitated by collapsing the stretched out rubber tube radially as by externally applied pressure or, preferably, by exhausting the interior of the tubing, causing it to be collapsed or partially collapsed radially by atmospheric pressure.

The finished tube, cured with the spring former left in place, has the internal surfaces of the walls of its helical ridge (corresponding to the ridge 26 of the corrugated tube shown in FIG. 16) disposed substantially flatwise against one another in contacting relation; the external surfaces of the ridge (corresponding to the surfaces 48, 49 of the FIG. 16 tube) are disposed in spaced generally parallel relation to one another, having been formed by the oppositely directed parallel surfaces 22, 23 of the spring metal strip comprising the former 6.

As shown in FIG. 11, the side surfaces 22, 23 of the helix former are of substantially the same radial extent as the ridge 26 of the shaped tube blank B. Thus when the steel former is left embedded in the corrugations during the cure it is employed to prevent adjacent portions of the external surface of the tubing blank from contacting one another and sticking together. The internal surfaces of the tubing blank which are in contact during the curing process are prevented from sticking or bonding together as by a suitable anti-adhesion agent such as a silicone solution or powdered soapstone applied in a preliminary operation before the tubing blank B is telescoped over the mandrel 1.

The present invention thus provides an improved apparatus for making spirally corrugated rubber tubing quickly and economically. The apparatus is simple to construct and can be cheaply made so that large outlays for capital equipment are not required in order that a rubber goods manufacturer can adopt the invention.

Formation in the raw rubber tube blank of embryonic corrugations by a combination of forces exerted through differential fluid pressure and by being progressively collapsed axially while the blank is supported internally on the mandrel and while it is restrained externally against distention along a continuous helical line by the spring former, provides an intermediate product comprising a raw rubber tube blank in which the embryonic corrugations can be readily reformed by axially recollapsing the blank while it is suitably supported internally as on an elongated mandrel.

In accordance with the patent statutes the principles of the present invention may be utilized in various ways, numerous modifications and alterations being contemplated, substitution of parts and changes in construction of the apparatus being resorted to as desired, it being understood that the apparatuses shown in the drawings and described above are given merely for purposes of explanation and illustration of the best known mode of practising and using the invention without intending to limit the scope of the claims to the specific details disclosed.

What we claim and desire to secure by Letters Patent of the United States is:

1. Apparatus for use in making spirally corrugated rubber tubing from a raw rubber tube blank of substantially uniform cross section, said apparatus comprising in combination an elongated hollow cylindrical mandrel adapted to receive the tube blank over it in telescopic supporting relation, a resilient helical former receivable telescopically over the mandrel and a tube blank supported on the latter, the former comprising a spring coil element the convolutions of which, in the unstressed condition, lie against one another and yieldingly resist axial separation, the coil convolutions having internal peripheral edge portions which collectively define a cylinder larger than the external surface of the supported tube blank for which the apparatus is designed whereby to provide an annular clearance between the received former and such supported tube, the radial cross sectional dimension of the element comprising the spring coil being greater than its axial cross sectional dimension whereby the former exhibits strong resistance to radial deformation forces and yields readily to axial stretching forces, means including means providing passages in the mandrel through which fluid under distending pressure is forced into the interior of such supported and embraced tube to expand the tube into engagement with said internal edge portions of the former, the former being adapted, upon the application to its ends of opposite axial tensioning forces, to extend and distribute its convolutions along the tube blank over which it is telescoped and being further adapted, upon the application of differential distending fluid pressure to the supported and embraced tube blank to engage the latter and control distension of the tube blank while both the tube blank and the extended former are supported by the mandrel, and said former when its convolutions are so distributed being further adapted, upon the release of said opposite tensioning forces, to apply through its inherent resiliency contracting axial forces to an expanded and engaged tube, whereby other forces applied to such a tube in collapsing it axially are augmented throughout the collapsing operation by said contracting forces applied by the resilient former.

2. Apparatus as in claim 1 in which the former comprises, on at least one end of the coil, a grasping member of larger transverse dimension than the coil to facilitate stretching of the coil along the mandrel by the operator.

References Cited by the Examiner

UNITED STATES PATENTS

| 2,766,806 | 10/1956 | Rothermel et al. | 18—19 X |
| 2,797,730 | 7/1957 | Martin | 18—19 X |
| 2,832,096 | 4/1958 | Kramer et al. | 18—45 |
| 2,936,812 | 5/1960 | Roberts | 18—45 X |

J. SPENCER OVERHOLSER, *Primary Examiner.*

J. HOWARD FLINT, JR., *Examiner.*